United States Patent
Savagaonkar et al.

(10) Patent No.: US 8,799,673 B2
(45) Date of Patent: Aug. 5, 2014

(54) SEAMLESSLY ENCRYPTING MEMORY REGIONS TO PROTECT AGAINST HARDWARE-BASED ATTACKS

(75) Inventors: Uday R. Savagaonkar, Portland, OR (US); Ravi Sahita, Beaverton, OR (US); David Durham, Beaverton, OR (US); Men Long, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 467 days.

(21) Appl. No.: 12/651,432

(22) Filed: Dec. 31, 2009

(65) Prior Publication Data

US 2011/0161677 A1    Jun. 30, 2011

(51) Int. Cl.
*H04L 29/06*    (2006.01)

(52) U.S. Cl.
USPC ............................................. 713/189

(58) Field of Classification Search
USPC ............................................. 713/189
See application file for complete search history.

(56) References Cited

U.S. PATENT DOCUMENTS

2005/0273571 A1* 12/2005 Lyon et al. ............... 711/203
2009/0113425 A1*  4/2009 Ports et al. ............... 718/1

* cited by examiner

*Primary Examiner* — Jason Gee
(74) *Attorney, Agent, or Firm* — Thomas R. Lane

(57) ABSTRACT

Systems, apparatuses, and methods, and for seamlessly protecting memory regions to protect against hardware-based attacks are disclosed. In one embodiment, an apparatus includes a decoder, control logic, and cryptographic logic. The decoder is to decode a transaction between a processor and memory-mapped input/output space. The control logic is to redirect the transaction from the memory-mapped input/output space to a system memory. The cryptographic logic is to operate on data for the transaction.

20 Claims, 5 Drawing Sheets

System 400

Method 500

SEAMLESSLY ENCRYPTING MEMORY REGIONS TO PROTECT AGAINST HARDWARE-BASED ATTACKS

BACKGROUND

1. Field

The present disclosure pertains to the field of information processing; more specifically, to information processing system security.

2. Description of Related Art

Information processing systems, such as those including a processor in the Intel® Pentium® Processor Family from Intel Corporation, may support operation in a secured system environment. A secured system environment may include a trusted partition and an un-trusted partition. The bare platform hardware of the system and trusted software may be included in the trusted partition. Direct access from the un-trusted partition to the resources of the trusted partition may be prevented to protect any secrets that the system may contain from being discovered or altered. These secrets may include passwords, keys, and private or confidential information generated or stored on the information processing system.

The bare platform hardware of the system may be included in the trusted partition or domain through the execution of a secured system entry protocol. For example, an initiating processor may execute a secured enter ("SENTER") instruction, to which all agents in the system must respond appropriately in order for the protocol to succeed. The responding agents may be prevented from executing any program instructions or process any external transactions during the secured entry process, so that the initiating processor may validate a signed code module as authentic and trusted, execute the signed code module to configure the system to support trusted operations, measure (cryptographically, using a hash extend function) and then initiate the execution of a measured virtual machine monitor (a "measured VMM" or "MVMM"). The MVMM may create one or more virtual machine environments in which to run un-trusted software, such that un-trusted software does not have direct access to system resources.

Other approaches to system security may be used in connection with or instead of the approach described above. However, many of these approaches may be vulnerable to hardware-based attacks. For example, an attacker having physical access to a system may remove or isolate system memory chips from the rest of the system to circumvent the protections provided by a memory controller, a chipset, software running on a processor, or any other system components, and directly read out their contents to discover keys, protected content, and other secret information stored in them.

BRIEF DESCRIPTION OF THE FIGURES

The present invention is illustrated by way of example and not limitation in the accompanying figures.

DETAILED DESCRIPTION

Embodiments of the present invention in systems, apparatuses, and methods for seamlessly protecting memory regions to protect against hardware-based attacks are described. In the description, specific details such as processor and system configurations may set forth in order to provide a more thorough understanding of the present invention. It will be appreciated, however, by one skilled in the art that the invention may be practiced without such specific details. Additionally, some well known structures, circuits, and the like have not been shown in detail, to avoid unnecessarily obscuring the present invention. Furthermore, this description may refer to instructions by names that may be used according to one embodiment (i.e., "SENTER"); in other embodiments, these instructions or similar instructions may have different names.

Embodiments of the present invention provide for seamlessly protecting memory regions to protect against hardware-based attacks. The use of these embodiments in an information processing system may be desirable to prevent an attacker having physical access to the system from reading the contents of system memory, where keys, protected content, and other secret information may be stored.

Figure 1:
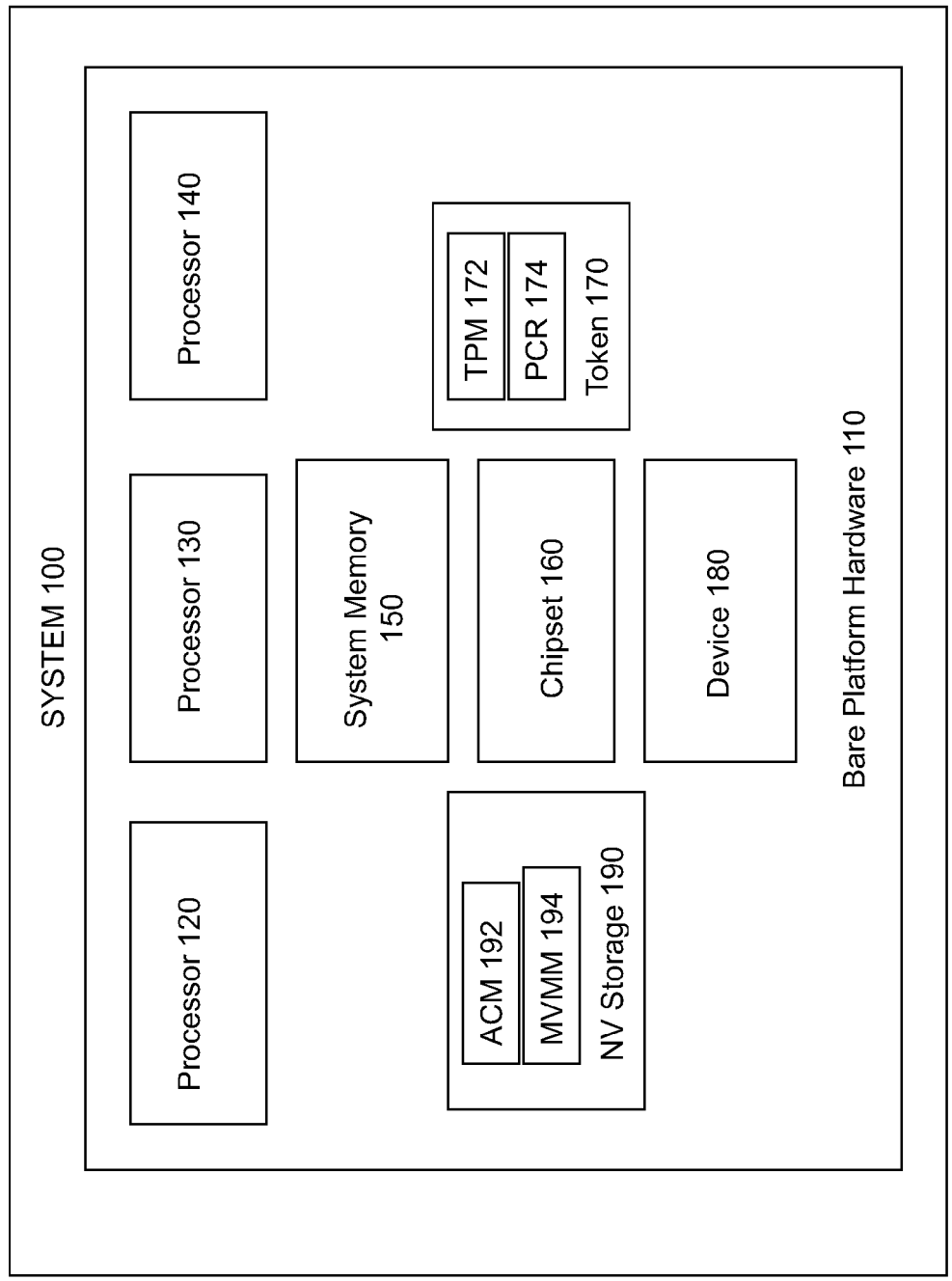
FIG. 1 illustrates an information processing system protected from hardware-based attacks according to an embodiment of the present invention.

FIG. 1 illustrates an embodiment of the present invention in information processing system 100. Information processing system 100 may be personal computer, a mainframe computer, a portable computer, a handheld device, a set-top box, a server, or any other computing system. In this embodiment, system 100 includes bare platform hardware 110, which in turn includes processors 120, 130, and 140, system memory 150, chipset 160, token 170, device 180, and non-volatile storage 190.

Each of processors 120, 130, and 140 may represent a component having one or more execution cores, where each execution core may be based on any of a variety of different types of processors, including a general purpose microprocessor, such as a processor in the Intel® Pentium® Processor Family, Itanium® Processor Family, or other processor family from Intel® Corporation, or another processor from another company, or a special purpose processor or microcontroller, or may be a reconfigurable core (e.g. a field programmable gate array). Although FIG. 1 shows three such processors, system 100 may include any number of processors, each including any number of execution cores and execution threads, in any combination. In some embodiments, any or all of processors 120, 130, or 140 may represent a separate hardware execution thread or "logical processor" running on one or more physical processors.

System memory 150 may be any medium on which information, such as data and/or program code, may be stored, such as dynamic random access memory, or any other type of medium readable by processors 120, 130, and 140, or any combination of such mediums.

Chipset 160 may represent any group of circuits and logic that supports memory operations, input/output ("I/O") operations, configuration, control, internal or external interface, connection, or communications functions (e.g., "glue" logic and bus bridges), and/or any similar functions for processors 120, 130, and 140 and/or system 100. Individual elements of chipset 160 may be grouped together on a single chip, a pair of chips, dispersed among multiple chips, and/or be integrated partially, totally, redundantly, or according to a distributed approach into one or more processors, including any of processors 120, 130, and/or 140.

Token 170 may include trusted platform module ("TPM") 172 and platform configuration register ("PCR") 174. TPM 172 may be a component, including a microcontroller, to securely store keys, passwords, digital certificates, and other information used to establish and maintain security. PCR 174 may include any number of registers and/or other storage locations to store system configuration information. TPM 172 and/or PCR 174 are configured to be accessible only to certain agents and/or under certain conditions. Token 170 and/or either or both of TPM 172 and PCR 174 may be included in chipset 160 or an other component in system 100.

Device 180 may represent any number of any type of I/O, peripheral, or other devices, such as a keyboard, mouse, trackball, pointing device, monitor, printer, media card, network interface, information storage device, etc. Device 180 may be embodied in a discrete component, or may be included in an integrated component with any other devices. In one embodiment, device 180 may represent a single function in a multifunctional I/O, peripheral, or other device.

Processors 120, 130, and 140, system memory 150, chipset 160, token 170, and device 180 may be coupled to or communicate with each other according to any known approach, such as directly or indirectly through one or more parallel, sequential, pipelined, asynchronous, synchronous, wired, wireless, or other bus or point-to-point connection. In one embodiment, system 100 may include a Peripheral Component Interconnect Express ("PCIe") bus, for example, connecting chipset 160 and device 180. System 100 may also include any number of additional devices, agents, components, or connections.

Figure 2:
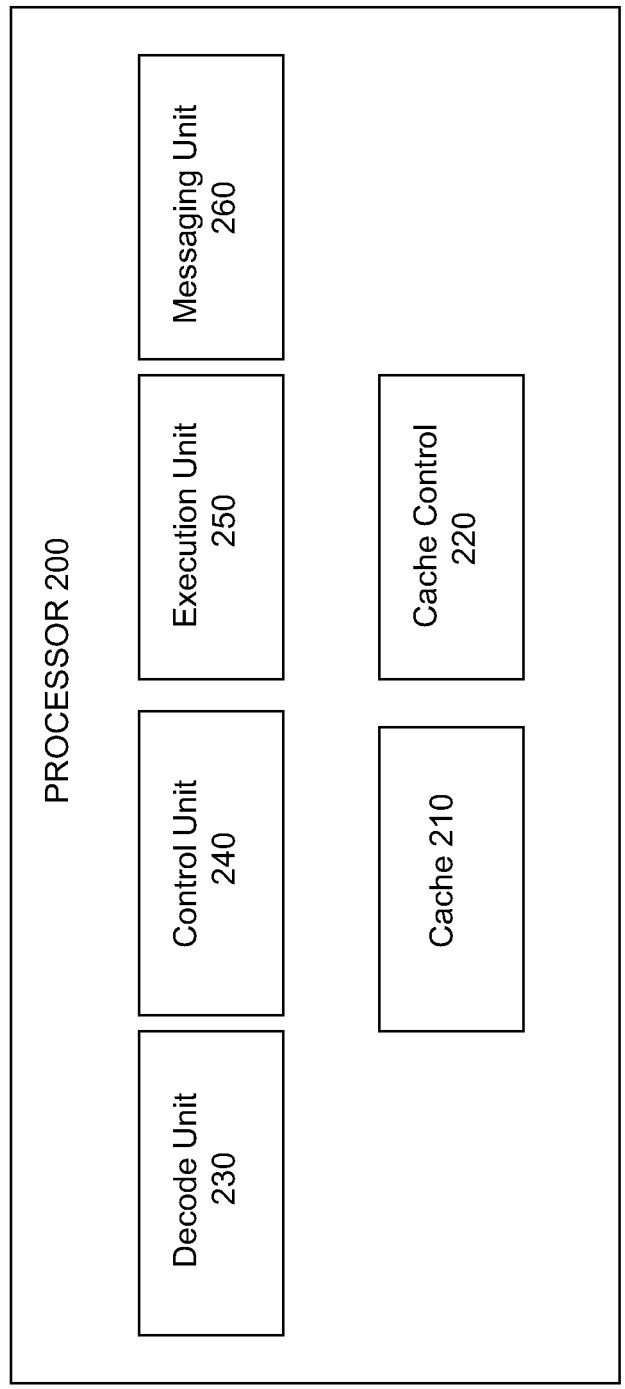
FIG. 2 illustrates a processor according to an embodiment of the present invention.

FIG. 2 illustrates processor 200, which may represent any of processors 120, 130, or 140, in FIG. 1, or any other processor according to an embodiment of the present invention.

Processor 200 may include cache 210, which may be static random access memory, or any other form of storage for information, such as data that is copied from system memory 150. Processor 200 (or cache 210) may also include cache control logic 220 to controls whether cache 210 operates in normal mode or in cache-as-random-access-memory ("CRAM") mode. In normal mode, cache 210 satisfies memory requests in response to cache hits, replaces cache lines in response to cache misses, and may invalidate or replace cache lines in response to snoop requests. In CRAM mode, cache 210 operates as random access memory in which requests within the memory range of the cache memory are satisfied by the cache memory and lines of the cache are not replaced or invalidated in response to snoop requests.

Processor 200 may also include instruction unit 230, control unit 240, execution unit 250, and messaging unit 260. Instruction unit 230 may include any circuitry, logic, or other hardware or structures, such as a decoder, to receive, recognize, decode, or otherwise receive instructions. Control unit 240 may include any circuitry, logic, or other hardware or structures, such as microcode, state machine logic, programmable logic, or any other form of control logic, to generate control signals for, or otherwise control processor 200 in response to instructions received by instruction unit 230 and/or messages received by messaging unit 260.

Execution unit 250 may include any circuitry, logic, or other hardware or structures to execute instructions received by instruction unit 230. Execution unit 250 may operate based on control signals generated by control unit 240. Messaging unit 260 may include any circuitry, logic, or other hardware or structures to generate messages to be sent by processor 200 to other components or agents in system 100, and to receive messages sent to processor 200 by other components or agents in system 100.

In one embodiment of processor 200, instruction unit 210 may be to receive an instruction (a "SENTER" instruction) for processor 200 to begin a process to establish a secured environment in system 100 (a "SENTER" process). In response to the SENTER instruction, control unit 240 generates control signals to cause messaging unit 260 to generate a "SENTER" bus message (or other type of message in a system wherein processors and other agents communicate by a means other than a bus) that is recognized by the messaging units of other processors and agents as a SENTER bus message. The processor or execution thread executing the SENTER instruction and sending the SENTER bus message is referred to as the "initiating logical processor" ("ILP").

Each processor, execution thread, or other agent in the system that receives the SENTER bus message is referred to as a "responding logical processor" ("RLP"). In response to the SENTER bus message, each RLP performs actions to prepare for the establishment of the secured environment and allow the ILP to proceed with launching the secured environment. One of these actions may be for their messaging units to generate an "ACK" bus message to acknowledge the receipt of the SENTER bus message.

Figure 3:
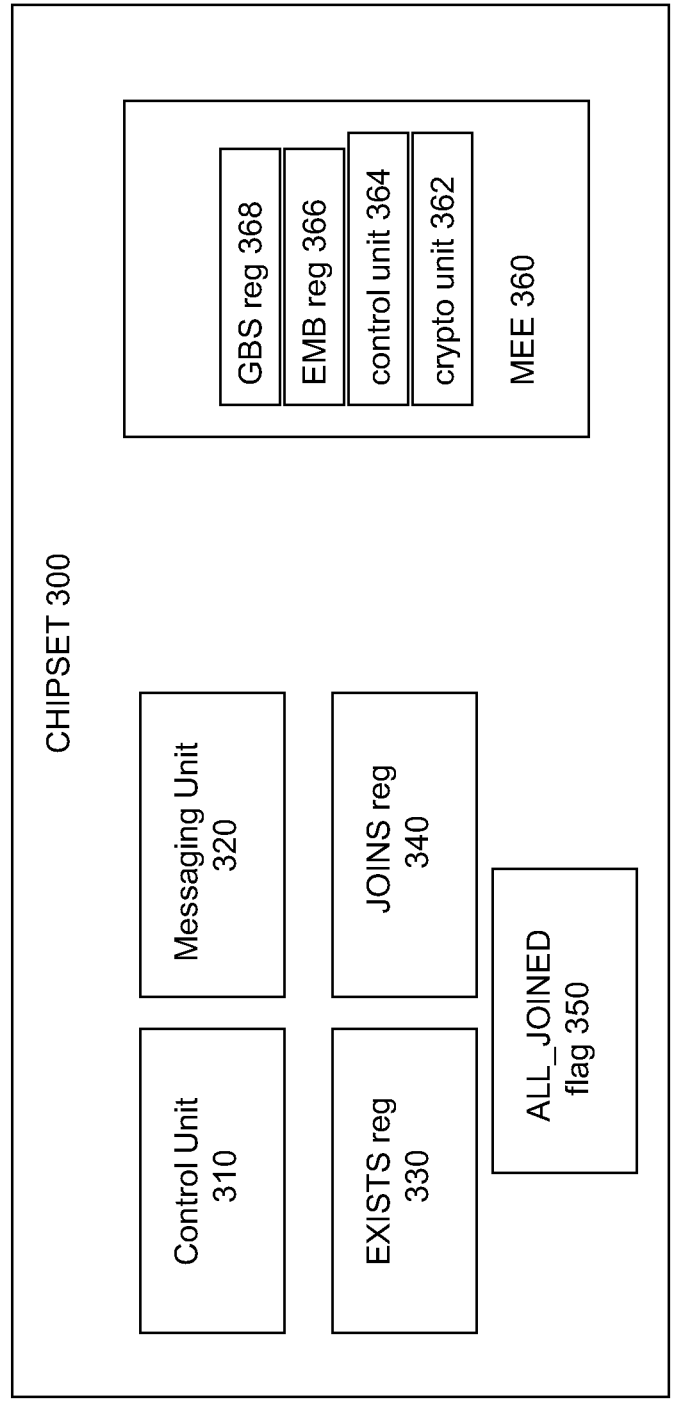
FIG. 3 illustrates a chipset according to an embodiment of the present invention.

FIG. 3 illustrates chipset 300, which may represent chipset 160, or any other chipset or component performing the function of chipset 160 according to an embodiment of the present invention. Chipset 300 may include messaging unit 310, control unit 320, "EXISTS" storage location 330, "JOINS" storage location 340, and "ALL_JOINED" storage location 350.

Messaging unit 310 may include any circuitry, logic, or other hardware or structures to generate messages to be sent by chipset 300 to other components or agents in system 100, and to receive messages sent by other components or agents in system 100. Control unit 320 may include any circuitry, logic, or other hardware or structures, such as microcode, state machine logic, programmable logic, or any other form of control logic, to generate control signals for, or otherwise control chipset 200 in response to messages received by messaging unit 310.

Each of "EXISTS" storage location 330, "JOINS" storage location 340, and "ALL_JOINED" storage location 350 may include a register or any other form of storage for information, and may include storage for any number of bits. In one embodiment, control unit 320 may use EXISTS storage location 330 to keep track of all logical processors and other agents operating in system 100, and JOINS storage location 340 to keep track of all logical processors and other agents that have acknowledged a SENTER bus message. When all processors and other agents in system 100, as reflected in EXISTS storage location 330, have acknowledged the SENTER bus message, as reflected in JOINS storage location 340, then control unit 320 may set an indicator in "ALL_JOINED" storage location 350 to indicate to the ILP that the launching of a secured environment may proceed. Note that in this description of the SENTER process, as in the rest of this description, many details not required to describe and enable embodiments of the present invention have been omitted, and many variations of the process are possible. For example, where the ILP and RLPs are connected on by a front-side processor bus ("FSB"), FSB transactions may include an identifier of the initiator of each transaction, and chipset 300 may be connected to the FSB to keep track of all FSB logical processors or other bus agents.

Returning to FIG. 1, non-volatile storage 190 may represent any number of separate non-volatile storage mediums in system 100, such as semiconductor flash memory or magnetic or optical disk. Non-volatile storage 190 may be used to store software components used in embodiments of the present invention. For example, non-volatile storage 190 may store authenticated code module ("ACM") 192 and measured virtual machine monitor ("MVMM") 194.

ACM 192 may be executed by a processor or processors during the SENTER process to perform any number of actions involved in establishing a secured environment. For example, ACM 192 may be used to initialize, configure, and test components within system 100 for their participation in the secured environment. In one embodiment, ACM 192 may be used to test the memory configuration of system 100, as controlled by memory controller functions in any processor, chipset, or other component in system 100, to ensure that access to certain pages or portions of system memory 150 may be limited or controlled such that MVMM 194 and/or other software used to secure system 100 may be protected when stored in system memory 150. In another embodiment, ACM 192 may be used to authenticate MVMM 194 and any other software to be used within the secured environment, and to launch the execution of MVMM 194.

MVMM 194 may be any virtual machine monitor, hypervisor, or other such software program that is a trusted entity invoked during a SENTER process to control one or more virtual machines to execute other software programs (often called a measured launch environment, or "MLE"), some of which are trusted and some of which are not trusted.

To establish a secured environment in system 100, system software such as an operating system ("OS") or basic input/output system ("BIOS"), running on any of processors 120, 130, 140, or any other processor in system 100 may transfer ACM 192 and MVMM 194 from non-volatile storage 190 to system memory 150, then cause one of these processors (e.g., processor 120) to execute a SENTER instruction. Execution of the SENTER instruction may cause processor 120, as the ILP, to issue a SENTER bus message, poll ALL_JOINED storage location 350 until all RLPs have acknowledged the SENTER bus message, configure cache 122 to operate in CRAM mode, and load ACM 192 (or a portion of ACM 192, in accordance with an embodiment of the present invention, as described below) into cache 122. Cache 122 may be configured to operate in CRAM mode so that cache 122 may serve as a private, secure memory in which processor 120 may authenticate ACM 192 (or a portion of ACM 192, in accordance with an embodiment of the present invention, as described below).

Returning to FIG. 3, chipset 300 may include memory encryption engine ("MEE") 360. MEE 360 may include any logic, circuitry, or other hardware or structures to provide a region or a number of regions of storage in system 100 that may be protected from hardware-based attacks. To facilitate the clarity of the description of the structure and functionality of MEE 360, MEE 360 will be described as providing a single protected region; however, the structure and function of MEE 360 may be extended to provide multiple protected regions.

MEE 360 may present the protected storage region to processors and other agents in system 100 as if it were storage space within a memory-mapped I/O ("MMIO") device; however, transactions directed to this MMIO space are redirected to system memory 150 by MEE 360. Therefore, this storage region may be referred to as "ghost" memory. In one embodiment, the ghost memory may be configurable (e.g., the size of the ghost memory and the MMIO addresses through which it may be accessed) through PCIe configuration transactions. After configuration, the protected ghost memory region is presented as a register in MMIO space, so it may be referred to as the ghost base address register ("BAR").

More specifically, in one embodiment MEE 360 may include cryptographic unit 362, control unit 364, encrypted memory base storage location ("EMB register") 366, and ghost BAR size storage location ("GBS register") 368.

Cryptographic unit 362 may include any logic, circuitry, or other hardware or structures, such as any number of arithmetic logic units, shifters, etc., to perform an encryption algorithm, a decryption algorithm, and/or any subset of operations used in an encryption algorithm. Cryptographic unit 362 may be dedicated to encryption/decryption according to a single standard or algorithm, such as the Galois/Counter Mode of the Advanced Encryption Standard ("AES-GCM").

Control unit 364 may include any logic, circuitry, or other hardware or structures, such as microcode, state machine logic, programmable logic, or any other form of control logic, to generate control signals for, or to otherwise control MEE 360 and/or cause MEE 360 to perform encryption, decryption, and the other functions described in this specification according to embodiments of the present invention.

EMB register 366 may include a register or any other form of storage for information, and may include storage for any number of bits. EMB register 366 may be a programmable register to store the address in system memory 150 to which accesses to the ghost BAR are redirected by MEE 360, and may be programmed, for example, by system software such as a VMM or OS.

GBS register 368 may include a register or any other form of storage for information, and may include storage for any number of bits. GBS register 368 may be a programmable register to store the size of the ghost BAR, and may be programmed, for example, by system software such as a VMM or OS. Since the ghost BAR is mapped into MMIO space, any modification to the GBS register value causes system software to reconfigure the PCIe space. This may be achieved by control unit 364 triggering a PCIe hot plug/unplug event whenever GBS register 368 is written.

Figure 4:
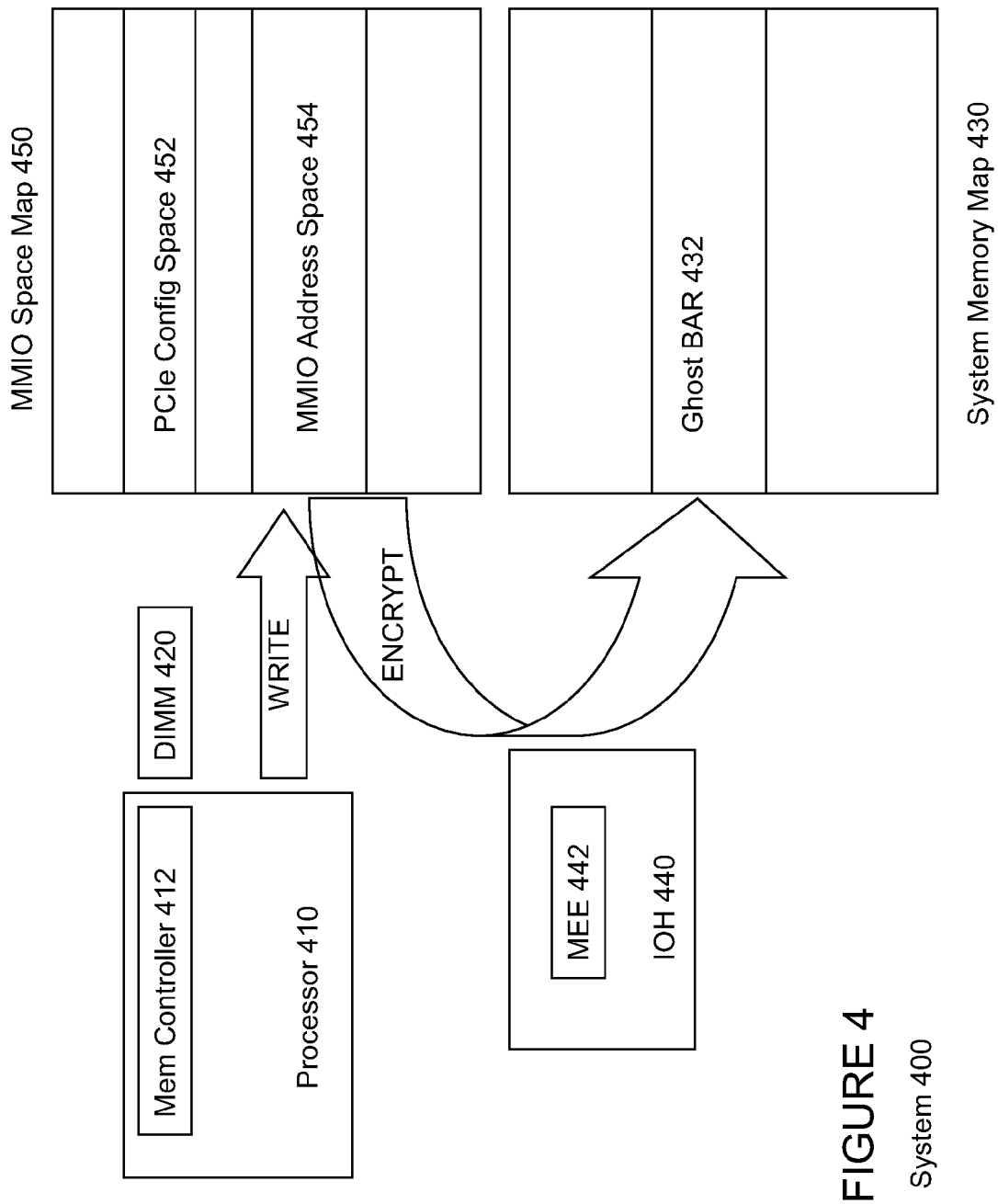
FIG. 4 illustrates the function of a memory encryption engine according to an embodiment of the present invention.

FIG. 4 illustrates the function of MEE 360 in system 400, a simplified architectural view of system 100 according to an embodiment of the present invention. Processor 410 may represent processor 120, and includes memory controller 412 to control access to dual inline memory module ("DIMM") 420 in which system memory 150 is realized. System memory map 430 may represent processor 120's view of system memory 150, and may include ghost BAR 432 which is not directly accessible by processor 120. I/O hub 440 may represent chipset 160, and includes MEE 442 to protect ghost BAR 432 from hardware-based attacks as described below. MMIO space map 450 may represent the MMIO space of system 100, which includes PCIe configuration space 452, and MMIO address space 454 through which processor 120 may indirectly access ghost BAR 432.

MEE 442 operates to protect ghost BAR 432 from hardware-based attacks in system 400 as follows. Processor 410 (or any other agent in system 400) may perform a transaction directed to the protected address space by initiating a memory read or write transaction to a memory address within MMIO address space 454. If the data for these is not present in the processor's cache, these transactions are sent from processor 410 and decoded and responded to by MEE 442. On a write transaction, MEE 442 encrypts the data to be written, and redirects the transaction to store the encrypted data in the corresponding location in ghost BAR 432. On a read transaction, MEE 442 redirects the transaction so as to read the requested data from the corresponding location in ghost BAR 432. However, before delivering the data from ghost BAR 432, MEE 442 decrypts the data.

Therefore, data stored in ghost BAR 432 may be encrypted so as to prevent an attacker from reading the data directly from DIMM 420. Software running on processor 410 (or any other agent in system 400) may write and read data to and from protected storage without being aware of the encryption process. All data travelling on the data bus in and out of the protected storage region is encrypted to prevent bus-analysis attacks. The protected storage region may be used to store keys, protected content, critical sections of an MVMM or other system software, and other secret information or code used to protect secret information.

In one embodiment, the size of ghost BAR 432 may by larger than the size of MMIO address space 454. For example, the AES-GCM encryption process generates a 16-byte tag for each 64-bytes of data that is encrypted. Therefore, the system may be configured such that the size of ghost BAR 432 is twenty-five percent larger than the size of MMIO address space 454 to provide for the storage of the tag along with the data.

Figure 5:
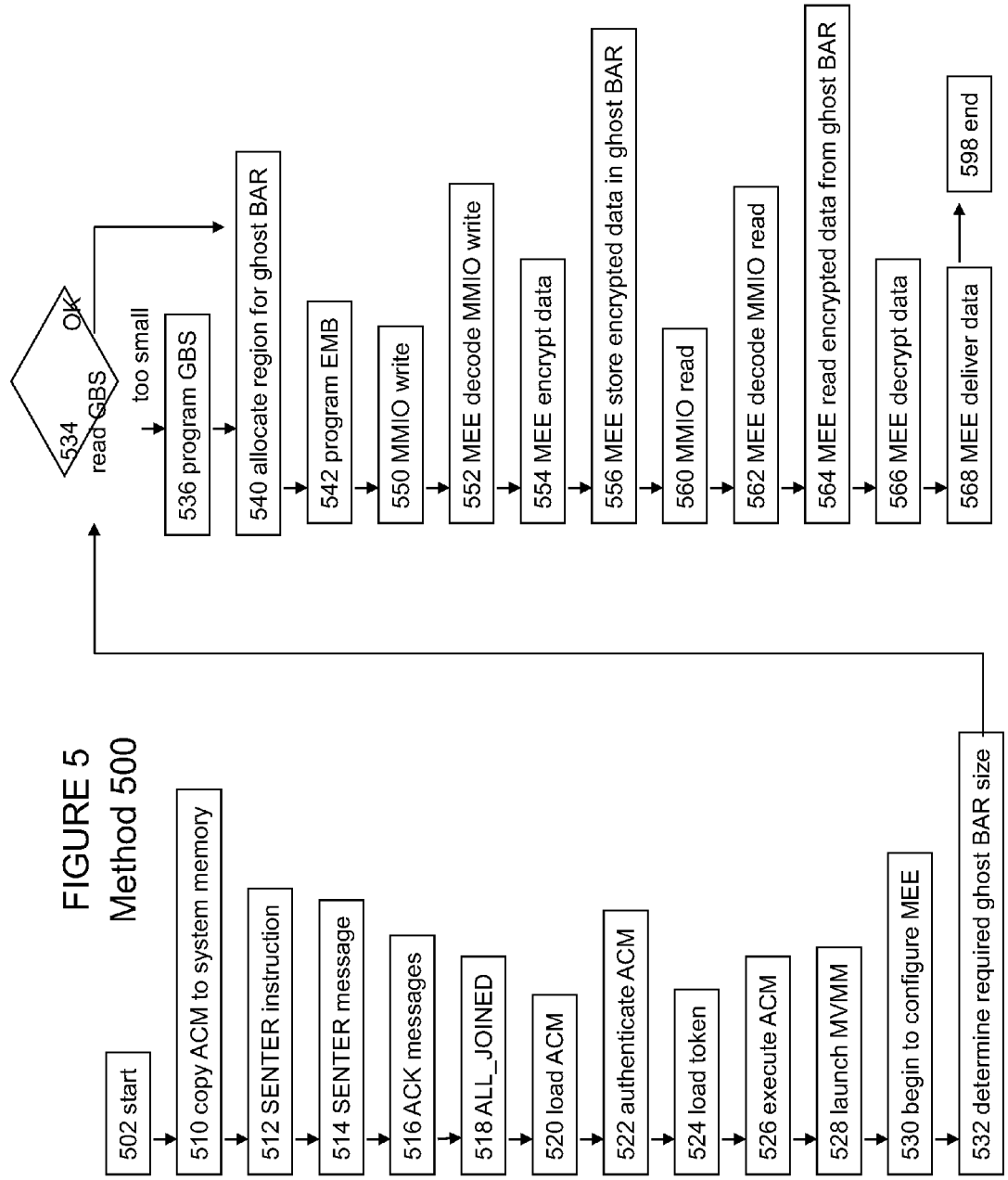
FIG. 5 illustrates a method for seamlessly encrypting memory regions according to an embodiment of the present invention.

FIG. 5 illustrates a method embodiment of the present invention, specifically method 500 for seamlessly encrypting a memory region. Although method embodiments of the invention are not limited in this respect, reference may be made to elements of system 100, processor 200, chipset 300, or system 400 to describe method 500 of FIG. 5.

Furthermore, certain actions performed in method 500 may be performed by processor 200, chipset 300, or MEE 360 in response to control signals generated by control unit 240, control unit 320, or control unit 364, respectively. Control signals in processor 200 may in turn be generated in response to instruction unit 230 decoding an instruction into one or more micro-instructions or micro-operations, and/or messaging unit 260 receiving a bus message or other transaction, and control signals in chipset 300 may in turn be generated in response to messaging unit 310 receiving a bus message or other transaction.

In box 502 of FIG. 5, method 500 may begin.

In box 510, the ACM may be copied from non-volatile storage to system memory, such as system memory 150, for example, by a BIOS, boot loader, or an OS running in system 100. In box 512, the entry of system 100 into a secured system environment may be initiated, for example, by a BIOS, boot loader, an OS issuing a SENTER instruction to processor 120. In box 514, an ILP (e.g., processor 120) may send a SENTER bus message. In box 516, each RLP in system 100 (e.g., processors 130 and 140) may send ACK bus messages. In box 518, an indication that all RLPs have joined in the SENTER process may be set, for example, in ALL_JOINED storage location 350.

In box 520, the ILP (e.g., processor 120) in system 100 may configure its cache to operate in CRAM mode and load the ACM into its cache. In box 522, the ILP may authenticate the ACM. In box 524, the ILP may send a hash of the ACM or other platform key to a token, such as token 170, to be stored in a PCR for use in sealing and unsealing secrets in the measured launch environment or secured system environment. In box 526, the ILP may execute the ACM. In box 528, the ILP may launch an MVMM.

In box 530, the MVMM may begin to configure system 100 to seamlessly encrypt a memory region to protect against hardware-based attacks. In box 532, the MVMM may determine the size required for ghost BAR based on the encryption algorithm used by MEE 360. In box 534, the MVMM may read GBS register 368 to determine the present size of the ghost BAR. If the size is too small, then in box 536, the MVMM may program GBS register 368 with the required size of the ghost BAR, which causes system software to reconfigure the PCIe space and reload the MEE driver.

If the size is adequate, then, in box 540, the MVMM may allocate a region in system memory 150 large enough for the ghost BAR. In box 542, the MVMM may program EMB register 366 with an address in system memory 150 to which accesses to the ghost BAR are to be redirected by MEE 360.

In box 550, processor 410 may perform a write to a memory address within MMIO address space 454. In box 552, the write transaction is decoded and responded to by MEE 442. In box 554, MEE 442 encrypts the data to be written. In box 556, MEE redirects the transaction to store the encrypted data in ghost BAR 432.

In box 560, processor 410 may perform a read transaction to a memory address within MMIO address space 454. In box 562, the read transaction is decoded and responded to by MEE 442. In box 564, MEE 442 redirects the transaction so as to read the requested data from ghost BAR 432. In box 566, MEE 442 decrypts the data. In box 568, MEE delivers the data to processor 410.

In box 598, method 500 may end.

Within the scope of the present invention, it may be possible for method 500 to be performed in a different order, with illustrated block performed simultaneously, with illustrated blocks omitted, with additional blocks added, or with a combination of reordered, combined, omitted, or additional blocks. Many variations of method embodiments of the present invention may be possible, but may not be apparent from the description of method 500.

For example, in one embodiment, the MVMM may relocate itself into the ghost BAR region. In an other embodiment, the MVMM may read the platform key from the TPM and store it in the ghost BAR region. In an other embodiment, the MVMM may measure application software, manipulate page tables to relocate confidential portions of application software to the ghost BAR region, and unwrap application keys using the platform key and store them in the ghost BAR region. In an other embodiment, the MEE may switch off when the processor performs a read or write in system management mode, so that the protected storage region cannot be comprised by a compromised system management interrupt handler. In an other embodiment, the MEE may generate a new key whenever the system comes out of a sleep mode, to prevent an attacker from putting the system into a sleep mode, removing the DIMM, replaying older DIMM contents, replacing it, and bringing the system out of sleep mode.

Thus, systems, apparatuses, and methods, and systems for seamlessly protecting memory regions to protect against hardware-based attacks have been disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   a decoder to decode one of a memory read and a memory write transaction on a connection between a first hardware component and a second hardware component in the apparatus, the transaction from a processor to a first address, the first address in a memory-mapped input/output space;

control logic to, in response to the decoder determining that the first address is within a protected region, redirect the transaction from the first address to second address, the second address in a system memory; and cryptographic logic to operate on data for the transaction.

2. The apparatus of claim 1, wherein the transaction is a write transaction and the cryptographic logic is to encrypt the data and the control logic is to write the encrypted data to the system memory.

3. The apparatus of claim 1, wherein the transaction is a read transaction and the control logic is to read encrypted data from the system memory and the cryptographic logic is to decrypt the encrypted data.

4. The apparatus of claim 1, further comprising a storage location to store a size of a region in the system memory to store encrypted data for the transaction.

5. The apparatus of claim 1, further comprising a storage location to store a base address of a region in the system memory to store encrypted data for the transaction.

6. A method comprising:

decoding one of a memory read and a memory write transaction on a connection between a first hardware component and a second hardware component in a system, the transaction from a processor to a first address, the first address in a memory-mapped input/output space;

performing, in response to the decoding determining that the first address is within a protected region, a cryptographic operation on data for the transaction; and redirecting, in response to the decoding determining that the first address is within the protected region, the transaction from the first address to second address, the second address in a system memory.

7. The method of claim 6, wherein the transaction is a write transaction and performing the cryptographic operation includes encrypting the data.

8. The method of claim 7, further comprising writing the encrypted data to the system memory.

9. The method of claim 6, wherein the transaction is a read transaction, further comprising reading encrypted data from the system memory.

10. The method of claim 9, further comprising decrypting the encrypted data.

11. The method of claim 10, further comprising delivering the decrypted data to the processor.

12. The method of claim 6, further comprising determining a size of a region in the system memory in which to store encrypted data for the transaction.

13. The method of claim 12, wherein the determination depends on the encryption operation.

14. The method of claim 12, further comprising programming a first location with the determined size.

15. The method of claim 12, further comprising allocating a space in the system memory having the determined size.

16. The method of claim 15, further comprising programming a storage location with a base address of the space in the system memory.

17. A system comprising:

a processor;

a system memory; and a memory encryption engine including:

a decoder to decode one of a memory read and a memory write transaction on a connection between a first component and a second component in the system, the transaction from the processor to a first address, the first address in a memory-mapped input/output space;

control logic to, in response to the decoder determining that the first address is within a protected region, redirect the transaction from the first address to second address, the second address in the system memory; and cryptographic logic to operate on data for the transaction.

18. The system of claim 17, wherein the transaction is a write transaction and the cryptographic logic is to encrypt the data and the control logic is to write the encrypted data to the system memory.

19. The system of claim 17, wherein the transaction is a read transaction and the control logic is to read encrypted data from the system memory and the cryptographic logic is to decrypt the encrypted data.

20. The system of claim 19, wherein the memory encryption engine further comprises:

a first storage location to store a size of a region in the system memory to store encrypted data for the transaction; and a second storage location to store a base address of the region.

* * * * *